June 23, 1953  T. L. SMITH  2,643,137
PIPE REPAIR CLAMP
Filed Dec. 11, 1951  2 Sheets-Sheet 1
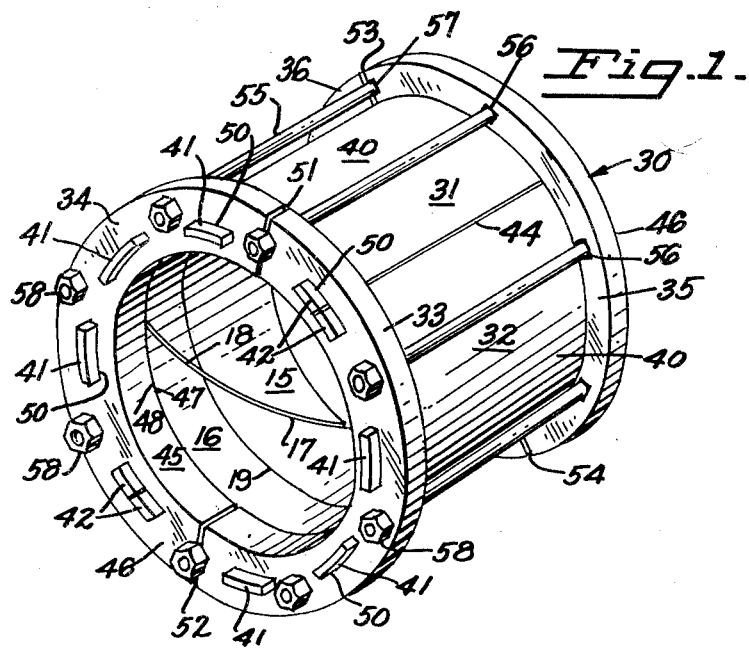
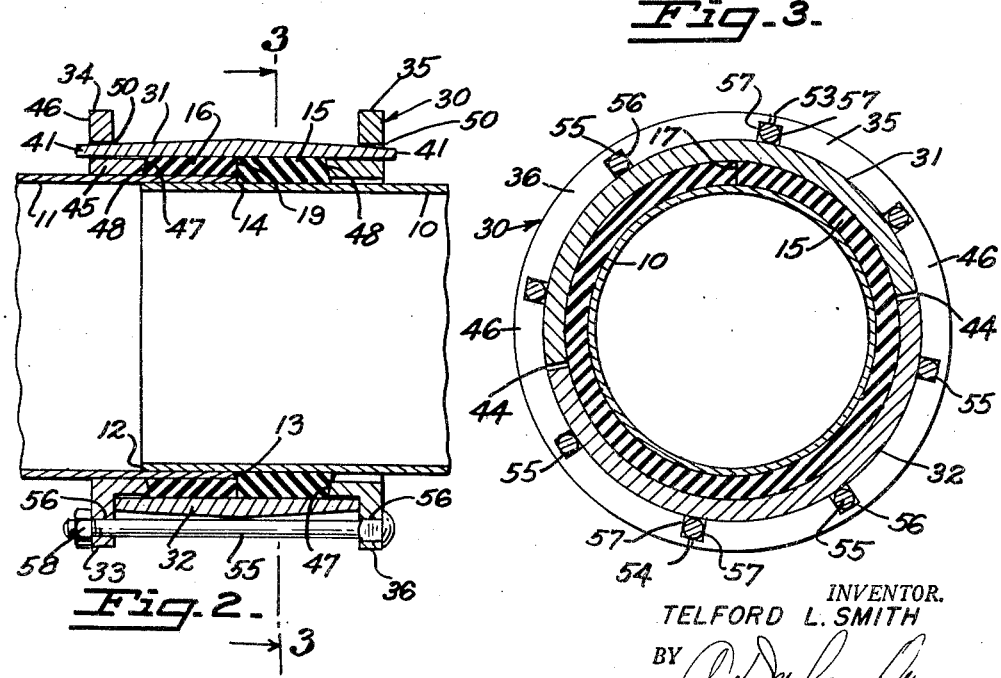
INVENTOR.
TELFORD L. SMITH
BY
ATTORNEY

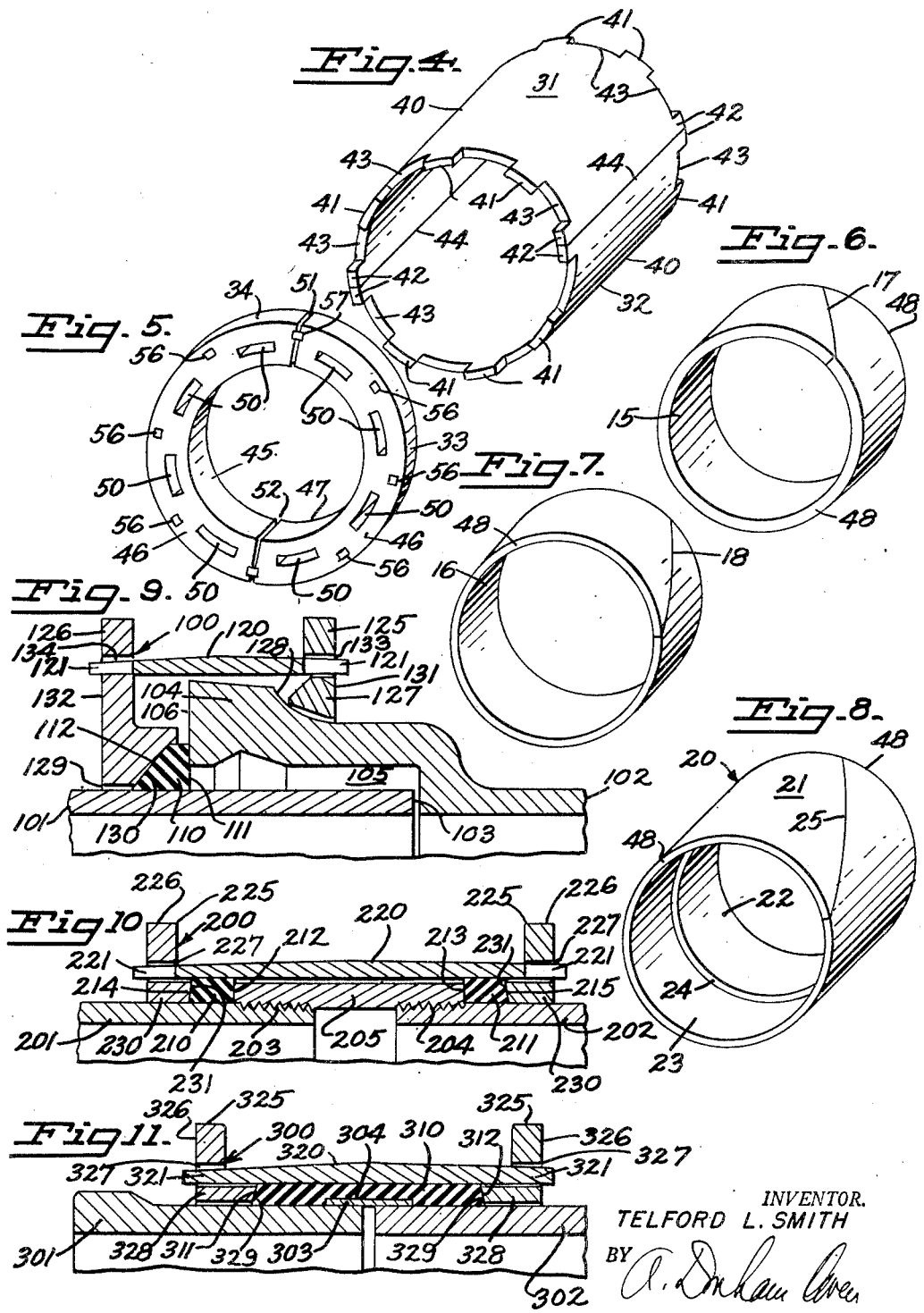

Patented June 23, 1953

2,643,137

UNITED STATES PATENT OFFICE 2,643,137

PIPE REPAIR CLAMP

Telford L. Smith, South San Francisco, Calif.

Application December 11, 1951, Serial No. 261,011

8 Claims. (Cl. 285—99)

This invention relates to an improved clamp for repairing pipes and preventing leaks therefrom, particularly at the joint where two pieces of pipe are coupled together.

In many instances pipes must be repaired while they are leaking or at other inconvenient times, and the work must be done quickly. Also it is often necessary to put on a clamp or to seal a coupling of two joined pipe sections without unjoining them or moving the pipe.

Neither inventors nor the industry has been able so far to provide a satisfactory solution for these problems. Clamps heretofore in use have either had to be slipped around the end of the pipe or have been made up of a number of pieces that have had to be aligned and held together by hand until the bolts that secured them were inserted and fastened in place. Furthermore, the gaskets in prior art clamps and couplings did not fit tightly enough against the pipes or the joints and did not prevent leaks.

The present invention has solved these and other problems by providing a novel clamp whose elements are quickly assembled around a pipe and, when assembled, hold themselves together in correct alignment even before bolts are put on. In fact, the bolts serve mainly to tighten the gasket against the pipe walls and to seal pipe junctures against leaks.

The clamp which has produced these important new results includes six main pieces: a pair of identical half-sleeves, and two pairs of half-collars. The half-sleeves extend longitudinally along the pipe and have a plurality of projecting fingers at each end. These fingers fit into openings that extend axially through the half-collars which span the division in the sleeves and automatically align and hold together both the half-sleeves and the half-collars. By this novel arrangement the sleeves hold the collars together, and the collars hold the sleeves together.

In combination with the clamp is a novel form of gasket that is preferably split by an oblique slit so that it can be spread apart and quickly placed around the pipe. When the clamp is in place, the gasket is tightened by inserting a plurality of bolts longitudinally between the two pairs of collars, parallel to the half-sleeves and then tightening the nuts on them.

Other objects and advantages will appear from the following detailed description of some preferred embodiments presented in accordance with U. S. Revised Statutes, Section 4888. The invention, however, is not intended to be limited narrowly to the details herein shown specifically, and the scope of the invention is to be gathered from the appended claims.

In the drawings:

Fig. 1 is a view in perspective of one preferred form of an assembled clamp embodying the principles of the invention. The clamp shown is adapted for installation around the juncture of two pieces of drive pipe.

Fig. 2 is a longitudinal section through the juncture of two pieces of drive pipe with the clamp installed therearound. Only a portion of each pipe is shown, so that space may be conserved.

Fig. 3 is a view in section taken along the line 3—3 of Fig. 2.

Fig. 4 is a view in perspective showing the pair of half-sleeves fitted together.

Fig. 5 is a view in perspective showing a pair of the half-collars fitted together.

Fig. 6 is a view in perspective of a gasket which may be used in the clamp to surround the outer wall of the inner drive pipe.

Fig. 7 is a view in perspective of a gasket which may be used in the clamp to go around the outer wall of the outer drive pipe.

Fig. 8 is a view in perspective of a one-piece gasket having two different-diameter portions and adapted to lie inside a clamp surrounding both the inner and outer drive pipes at their juncture.

Fig. 9 is a fragmentary view in section showing a portion of a modified form of clamp and gasket involving the principles of this invention and installed around a bell-and-spigot joint.

Fig. 10 is a view similar to Fig. 9 showing a portion of another modified form of coupling repair member installed around the juncture of two pieces of pipe that are secured together by a screw coupling sleeve.

Fig. 11 is a view similar to Figs. 9 and 10 showing a portion of another modified form of the coupling repair member installed around the juncture of two pieces of spigot end pipe or plain end pipe.

This invention can be used with many different types of pipe, some changes in details being made to accommodate the differences in the pipe ends. As examples of what may be done, four different modified forms of clamp are shown and described. Still other forms and installations are possible. For example, the clamp may be used with a single gasket around the middle of a piece of pipe instead of the more difficult juncture of two pipes.

Clamp for a drive-pipe juncture—(Figs. 1–8)

Fig. 2 shows portions of two lengths 10 and 11 of drive pipe coupled together by driving the smaller end 12 of the piece 10 into the larger end 13 of the piece 11. This type of coupling often leaks through the juncture point 14 between the pipe end 13 and the wall of the pipe 10. The present invention is a clamp-and-gasket structure designed to prevent such leaks. It may be installed at the time the pipe is first joined together or at a later time after a leak has developed. In either instance, a gasket or pair of gaskets are first placed around the pipes 10 and 11; the clamp is placed around the gasket or gaskets; and the clamp is used to tighten the gaskets against the pipe walls. Since the outer diameter of the pipe 10 near the juncture 14 is necessarily smaller than the outer diameter of the pipe 11, the gasket or gaskets must accommodate this difference in diameters. Two general types of structure will do this. One of them is the two-piece gasket assembly 15, 16 shown in Figs. 2, 6, and 7, and the other is the one-piece gasket 20 shown in Fig. 8.

In the two-piece assembly, the gaskets 15, 16 are made with their outer diameters substantially equal, but with their inner diameters different—the resilient gasket 15 (Figs. 2 and 6) which fits around the smaller pipe 10 being thicker than the resilient gasket 16 (Figs. 2 and 7) which fits around the larger pipe 11. The gaskets 15 and 16 are preferably both split obliquely at 17 and 18 in order that they may be spread apart and put around an already installed pipe. Preferably the gasket members 15 and 16 abut each other at 19 just above the pipe juncture 14.

The gasket 20 (Fig. 8) looks approximately the same as the gaskets 15, 16 when it is installed. It comprises a single piece of resilient material with an outer surface 21 of uniform diameter. Inside it has two integrally-connected different-inner-diameter portions 22 and 23 which join at a shoulder 24. The thickness of the shoulder 24 is approximately equal to the thickness of the pipe 11. By spreading the gasket 20 apart along the oblique slit 25, it may be wrapped around the pipes 10 and 11, the shoulder 24 then abutting the pipe end 13 and sealing the juncture 14. The thin-walled gasket portion 23 then encircles the outer pipe 11, and the thick-walled portion 22 encircles the pipe 10.

Either form of gasket, when installed, is then encircled by a clamp 30 and tightened into a tight sealing position. The clamp 30 includes six main members: a pair of half-sleeves 31 and 32; and two pairs of half-collar members 33, 34, 35 and 36.

The half-sleeves 31 and 32 are identical, with semi-cylindrical shells 40 that fit around the outer surface of the gasket. At each end of each shell 40 a plurality of fingers 41 and 42 project beyond recessed portions 43. The fingers 41, 42 lie around the sleeve ends at regular intervals, which are preferably spaced so that the fingers 42 (which lie along the axial edges 44 where the half-sleeves 31, 32 abut each other) are exactly half as wide as the fingers 41. The fingers 42, 42 that abut when the sleeves 31 and 32 are assembled, when taken together, constitute the exact equivalent in size and location of one full-sized finger 41.

The half-collars 33, 34, 35 and 36 for the drive-pipe clamp 30 may be identical, semi-annular with an inner axial flange 45 and a radial flange 46. The inner diameter of each assembled end collar 33, 34 or 35, 36 is approximately the same as, or only slightly greater than, the outside diameter of the outer pipe 11 or the inside diameter of the gasket portions 16 or 23. The axial flanges 45 preferably terminate in sloping shoulders 47 that abut similarly sloped shoulders 48 on the gaskets.

The radial flanges 46 are perforated by a plurality of openings 50 which receive the fingers 41 and 42. As shown in Fig. 5, the openings 50 are spaced regularly around the radial flanges 46 and their perimeters are fully closed—none of the openings 50 being an open-end slot or a half-size opening. This means that when the half-collars 33, 34, 35, 36 are installed on the half-sleeves 31, 32, the axial edges 51, 52, 53, 54 where the half-collars abut lie at different angular positions from the axial edges 44 where the half-sleeves 31, 32 abut (see Figs. 1, 3, 4, and 5). Thus when the collar 33 is installed, one slot 50 will hold together two half fingers 42, 42, thereby linking together the two sleeves 31, 32. One end 51 of the half-collar 33 then lies against the half-sleeve 31 and the other end 52 lies against the half-sleeve 32. Similarly, when the half-collar 34 is installed, one of its ends 51, 52 will lie over each of the half-sleeves 31, 32, and one of its slots 50 will hold together the other two half-sized fingers 42, 42. The half-collars 35, 36 are then installed around the opposite end of the half-sleeves 31, 32, preferably being placed so that their abutting axial edges 53, 54 lie at a different angular position from either the edges 44 or the edges 51, 52. Thus the half-collars 33, 34 and 35, 36 hold the half-sleeves 31, 32 together, and the sleeves, in turn, hold the collars together, and the meshing of the fingers 41, 42 in the openings 50 assures accurate alignment.

The installation of the clamp 30 is then completed by tightening it, so as to compress the gaskets. To accomplish this, a series of bolts 55 are passed through full sized openings 56 and abutting pairs of half-sized openings 57 in the radial flanges 46 of the half-collars 33, 34, 35, 36. The bolts 55 are tightened by means of nuts 58. Due to the facts that: (1) the two half-sleeves 31, 32 are identical, (2) the four half-collars 33, 34, 35, 36 are identical, and (3) the bolt openings 56, 57 and the finger-receiving openings 50 are spaced regularly about the half-collars, there is never any difficulty in inserting and aligning the bolts 55 or in putting on the nuts 58 and tightening them.

The inward pressure of the bolts 55 causes the sloping shoulders 47 to press in against the sloping faces 48 of the gaskets, thus causing the gaskets to seal tightly around the pipes 10 and 11 and around the pipe junctures 14.

To summarize the assembly and operation of the clamp 30: the gasket 20 or the pair of gaskets 15 and 16 are first wrapped around the pipes 10 and 11 by spreading them apart at the slits 25 or 17 and 18. Then the half-sleeves 30 and 31 are placed around the gasket or gaskets with the half-fingers 42 abutting and aligned together. One half-collar 33 is placed over one end of the half-sleeves 31, 32 so as to engage two half-fingers 42 in a single hole 50 and thereby hold the half-sleeves together. Then the mating half-collar 34 is installed over the other half of the same end. The operation is then repeated at the other end of the half-sleeves 31, 32 by installing the half-collars 35, 36. Then the bolts 55 are inserted and tightened by means of the nuts 58. The axial flanges 45 compress the gaskets 15 and 16 or the gasket 20 and prevent any leaks from occurring through the pipe juncture 14. The inclined shoulders 47, 48 serve to resolve the force inwardly against the pipe walls.

Removal may be accomplished by taking the steps in reverse order, i. e., removing the nuts from the bolts, withdrawing the bolts, and taking off first the collars, then the sleeves, and finally the gaskets.

Clamp for bell and spigot juncture

Fig. 9 shows a modified form of clamp 100 adapted to fit around a bell-and-spigot type of pipe juncture. The pipes 101 and 102 are joined by inserting the spigot end 103 of the pipe 101 into the bell 104 of the pipe 102.

A gasket 110, preferably of the split-ring type, encircles the pipe 101 and abuts the bell 104, closing the space 105 between the bell 104 and the spigot 103. Preferably the gasket's inner face 111 is vertical and its outer face 112 is inclined.

The clamp 100 encircles the gasket 110 and includes a pair of identical half-sleeves 120 that differ from the half-sleeves 31, 32 only in length and diameter. Fingers 121 and half-size fingers (not shown) project from each end of the half-sleeves 120, in exactly the same way that the fingers 41 and 42 projected from the half-sleeves 31, 32.

The half-sleeves 120 are held together by two pairs of half-collars. One pair of identical half-collars 125 fits around the bell 104, while the other pair of identical half-collars 126 fits around the pipe 101, so that although the outer diameters of the half-collars 125, 126 are the same, their inside diameters are necessarily different. The half-collar 125 has an axial flange 127 sloped to fit around the outside of the bell 104 and to engage the bell's flange 128. The collar 126 has an axial flange 129 with an angularly inclined lip 130 which abuts the face 112 of the gasket 110. Both half-collars 125, 126 have radial flanges 131, 132 with openings 133, 134 to receive the fingers 121 and the two adjoining half-fingers (not shown) of the half-sleeves 120. Bolts (not shown) similar to the bolts 55 may be installed and used to tighten the gasket 110 in place.

Like the clamp 30 shown in Figs. 1 through 8, the clamp 100 of Fig. 9 is installed by first putting on the gasket 110. Then, if desired, the sleeves 120 may be placed around the bell 104 and the collars 125, 126 placed over their ends, the openings 133, 134 holding the fingers 121. When the bolts (not shown) are tightened, the lip 130 forces the gasket 110 tightly against the lip 106 of the bell 104 and efficiently prevents leakage.

Clamp for screw-coupling

Fig. 10 shows a modified form of clamp 200 applied to a screw-coupling type of pipe juncture. In this case the pipes 201 and 202 have threaded ends 203, 204 that are held together by a threaded sleeve 205. The threads at 203, 204 may run in opposite directions so that the sleeve 205 can be tightened simultaneously on both pipes 201, 202, but the clamp 200 of this invention will work whether this is the case or not.

Preferably two substantially identical gaskets 210 and 211 are used. Each of these may be a split ring, preferably with vertical inner faces 212, 213 and inclined outer faces 214, 215.

The clamp 200 includes a pair of identical half-sleeves 220 having projecting full-sized fingers 221 and half-sized fingers (not shown) at each end. The half-sleeves 220 are like the half-sleeves 31 and 32, except for differences in length and diameter.

Two pairs of identical half-collars 225 are used, one pair being installed on each end of the half-sleeves 220. Each half-collar 225 has a radial flange 226 pierced by a plurality of openings 227 adapted to receive the fingers 221 or two adjoining half-fingers (not shown). The collar halves 225 also have axial flanges 230 whose inner lips 231 are preferably inclined and abut the inclined faces 214, 215 of the gaskets 210 and 211, so as to aid in tightening the gaskets 210, 211 when the bolts (not shown) are applied.

Clamp for spigot end pipe

Fig. 11 shows a clamp 300 secured around a pair of spigot-end pipes. Cement-asbestos pipes are often made in this manner. Around the place where the two pipes 301 and 302 abut or almost abut, is a split gasket 310, which is preferably recessed at 304 to receive a split ring 303 of malleable metal. Preferably the ring 303 is bonded to the resilient gasket 310 before the installation. The ring 303 prevents the ends of the pipes 301, 302 from damaging the gasket 310 when the clamp is tightened. In place of a split gasket, a two-piece gasket may be used.

The clamp 300 includes a pair of identical sleeve halves 320 with projecting fingers 321 and half-sized fingers (not shown) at the edges. Two identical pairs of identical collar halves 325 have radial flanges 326 provided with openings 327 that receive the fingers 321. The half collars 325 also have axial flanges 328 whose inclined lips 329 lie against the inclined outer faces 311 and 312 of the gasket 310. The gasket 310 is compressed when the clamp is tightened by bolts not shown.

Other types of installation are possible but the foregoing examples are believed to be sufficient to illustrate the principles involved. In general, there is a gasket comprising one or more parts, a pair of half-sleeves having projecting fingers on their outer axial ends and having half-sized fingers along the edges so they will abut each other when the half-sleeves are joined together. When the two half-sleeves abut, there is a full circle of regularly-spaced projecting fingers substantially identical in size and shape. In every form of the invention, the half-sleeves are held together by two pairs of half collars, each member of either pair being identical whether or not the two pairs are identical. The collar halves fit around the ends of the half-sleeves and have axial openings which receive the axial fingers and half-fingers and serve to hold the half-sleeves together. At the same time the fingers hold the half-collars together. In each instance there is preferably an axial flange on the collar half which serves to compress the gasket when the clamp is tightened by means of axially-extending bolts that join the two pairs of collars.

I claim:

1. A device for repairing or coupling pipes, including in combination a pair of identical, semi-cylindrical sleeves having at each end a series of evenly spaced projecting fingers substantially identical in size and shape except for a pair of half-sized fingers that are on the edge where the two sleeves abut, the two abutting half-sized fingers forming together a finger substantially identical in size with the full sized fingers and spaced regularly in respect to them; two pairs of semi-cylindrical collars each having a radial flange and an axial flange, the collars of each pair being identical, said radial flange having openings adapted to receive said fingers, all said openings being full sized openings and being inset from the edge so that none of the openings are open-end slots, said radial flange also having a plurality of bolt openings, said axial flange having an inclined inner lip; gasket means adapted to fit inside said sleeve and having inclined outer faces that bear against the inclined lips of said axial flanges and means urging the pair of collars at one end of said sleeve in toward the opposite pair of collars to compress said gasket means therebetween.

2. The device of claim 1 in which the gasket means are split and annular.

3. The device of claim 2 in which the gasket means comprises two split annuli of identical outer diameter but different inner diameters, so that they can seal tightly against a drive-pipe joint.

4. The device of claim 2 in which the gasket means comprises a single split annulus of uniform outer diameter and having two portions of different interior diameter that abut at a flat circular shoulder.

5. A device for repairing or coupling pipes including in combination a pair of identical semi-cylindrical sleeves having at each end a series of evenly spaced-apart projecting fingers substantially identical in size and shape except for a pair of half-sized fingers at each of the edges where the sleeves abut so that the two abutting sleeves form together a cylindrical sleeve and the abutting fingers then form a finger substantially identical in size with the full sized fingers; two identical pairs of split collars each having a radial flange and an axial flange, said radial flange having openings adapted to receive said fingers, all said openings being full sized openings and being inset from the edge so that none of the openings are open-end slots, said radial flange also having a plurality of bolt openings, said axial flange having an inclined inner lip; gasket means adapted to fit inside said sleeve and having inclined outer faces that bear against the inclined lips of said axial flanges; and bolts extending longitudinally between said collars and forcing them inwardly against said gasket means.

6. A device for repairing or coupling pipes including in combination a pair of complementary sleeve members, having at each end a series of regularly spaced projecting fingers substantially identical in size and having at their abutting edges complementary members that when they abut form a finger of the same size and at the same regular spacing as the other fingers; a pair of complementary collar members adapted to fit on each end of said sleeve, each collar having a radial flange and an axial flange, said radial flange having openings adapted to receive said fingers and also having a plurality of bolt openings; at least one split annular gasket adapted to fit inside said sleeve to bear against said axial flanges; and a plurality of bolts urging said collars in toward each other.

7. A device for repairing or coupling pipes including in combination a plurality of complementary sleeve members having at each end a series of regularly spaced apart projecting fingers; and two complementary collar members each having a radial flange and an axial flange, said radial flange having openings adapted to receive said fingers.

8. A device for repairing or coupling pipes including in combination a plurality of complementary sleeve members having at each end a series of regularly spaced apart projecting fingers; two groups of a plurality of complementary collar members each having a radial flange and an axial flange, said radial flange having openings adapted to receive said fingers and a plurality of bolt openings; gasket means adapted to fit inside said sleeve and with its ends bearing against said axial flanges; and a plurality of bolts urging said collars in toward each other and against said gasket means.

TELFORD L. SMITH.

References Cited in the file of this patent

UNITED STATES PATENTS

| Number | Name | Date |
|---|---|---|
| 808,922 | Herrick | Jan. 2, 1906 |
| 2,551,695 | Oddy | May 8, 1951 |

FOREIGN PATENTS

| Number | Country | Date |
|---|---|---|
| 225,024 | Switzerland | Dec. 31, 1942 |